United States Patent [19]
Benz

[11] Patent Number: 5,169,191
[45] Date of Patent: Dec. 8, 1992

[54] HAND SCOOP FOR LEAVES AND GRASS

[76] Inventor: Arthur F. Benz, Rte. 1, Box 383A, Sullivan, Mo. 63080

[21] Appl. No.: 784,892

[22] Filed: Oct. 30, 1991

[51] Int. Cl.$^5$ .................... A01B 1/00; A01D 11/00
[52] U.S. Cl. .................................. 294/55; 294/25; 294/49; 294/50.8
[58] Field of Search .............. 294/1.1, 1.3, 25, 49, 294/50.6–50.9, 51, 52, 55; 15/104.8, 257.1, 257.6; 56/400.01, 400.04, 400.12

[56] References Cited

U.S. PATENT DOCUMENTS

| | | | |
|---|---|---|---|
| 1,574,927 | 3/1926 | Otto | 294/25 X |
| 2,180,544 | 11/1939 | Nissen | 294/49 |
| 2,546,113 | 3/1951 | Spang | 294/49 X |
| 2,652,279 | 9/1953 | Morris | 294/50.9 |
| 3,407,927 | 10/1968 | Jones | 294/25 X |
| 3,877,742 | 4/1975 | Hatfield | 294/55 |
| 3,975,043 | 8/1976 | Miles | 294/25 |
| 4,127,481 | 8/1918 | West | 294/25 |
| 4,188,055 | 2/1980 | Green | 294/25 X |
| 4,378,670 | 4/1983 | Check et al. | 294/50.8 X |
| 4,477,114 | 10/1984 | Callis | 294/50.8 X |
| 4,682,803 | 7/1987 | Andrews | 294/25 |
| 4,747,633 | 5/1988 | Stacy | 294/25 X |
| 4,754,499 | 7/1988 | Pirie | 294/25 X |
| 4,866,922 | 9/1989 | Clark | 294/50.6 X |

FOREIGN PATENT DOCUMENTS

| | | | |
|---|---|---|---|
| 1159793 | 7/1958 | France | 294/50.8 |
| 673926 | 4/1990 | Switzerland | 294/50.8 |

*Primary Examiner*—Johnny D. Cherry
*Attorney, Agent, or Firm*—Robbins & Robbins

[57] ABSTRACT

A pair of hand held scoops are provided for gathering loose material such as leaves, grass cuttings or the like. The scoops are identical in construction and have hand holders whereby the scoops may be used to compress a load of the material between the scoops to be carried to a discharge station. The hand holders may be in the shape of hand receiving pockets which are provided with thumb openings at opposed sides in order that each scoop may be used interchangeably for the left or right hand of the user. Each scoop is constructed of a rigid plate-like member of plastic or the like having at least one straight side which may be employed to the ground in the scoop and gathering operation. Desirably, the scoop may be a rectangular form with the hand holder oriented diagonally to present a straight bottom side toward the ground for efficiency in gathering the loose material and when used alternately between a left hand and right hand different bottom sides are presented to reduce wear. An inwardly turned lip along the edges facilitates retention of the loose material when the scoops compress the gathered material.

6 Claims, 1 Drawing Sheet

HAND SCOOP FOR LEAVES AND GRASS

BACKGROUND OF THE INVENTION

In the past difficulty has been encountered by homeowners in handling leaves, loose grass cuttings or the like. While such material may be easily raked in piles or the like, the problem remains of picking up the pile and carrying it to a station for further disposal.

While some hand held scoops have been proposed which may be used one on each hand to compress a small pile together these have generally employed tines at the bottom which may not be desirable for reasons such as tine breakage, lack of close engagement with the ground, sifting of material between the tines, complex construction, expense and the like.

It has remained to be a problem to dispose of, or carry small loads of loose leaves, grass cuttings and other such material.

SUMMARY OF THE INVENTION

By means of this invention, there has been provided a pair of hand held scoops which may be simply employed by the user to pick up loose material such as leaves, grass cuttings or the like. The scoops are held in both the left and right hands of the user and are compressed together in a pile of leaves, as an example, with the leaves held between the scoops for easy transport to a gathering station for disposal as desired.

The scoops are identical in construction and are designed in such a manner that each scoop may be used by either the left hand or right hand of the user. Each scoop is constructed of a rigid plate-like member such as plastic or the like. An inwardly turned lip along the edges serves to retain leaves or the like when a load is held between the scoops. The scoops may desirably be made in rectangular form with a straight bottom side serving to engage closely the ground in the gathering operation.

The scoops are provided with hand holders on the exterior of the plate members to facilitate grasping the scoops. The hand holders have an opening in which the hand is received to provide mobility in maneuvering the scoops in the gathering operation.

By a special orientation of the hand holders diagonally on the exterior of the scoop either the left hand or right hand may be used interchangeably on the same scoop. The hand holders are desirably made in the form of an open pocket in which the hand is interfitted. Openings are provided in opposed sides of the pocket to receive either the left or right hand thumb of the user when the hands are interchanged.

The hand held scoops of the invention are simple in construction and use and by their rugged construction are employable for yard work for extended and various usages.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 2:
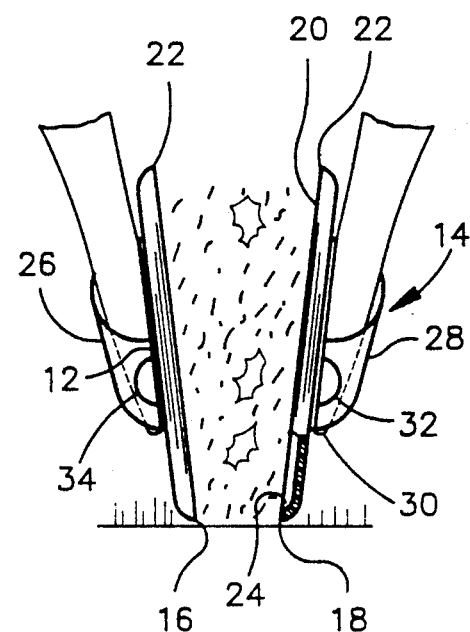
FIG. 2 is an end view of the scoops taken from the right side of FIG. 1 and partially broken away in section to show the lip construction.

The hand held scoops of this invention are generally designated by the reference numeral 10. They are used in pairs as shown in FIG. 2 and are identical in construction, being comprised of a plate member 12 and hand holders 14.

The plate members 12 may be made of any suitable rigid material of construction such as plastic, sheet metal or the like. The plate member 12 desirably is rectangular and as shown is square, having straight sides 16, 18, 20 and 22 at least one of which is employed in close ground-engaging relation in the loose material gathering or scooping operation shown in FIGS. 1, 2 and 3. An inwardly turned lip or flange 24 as best shown in FIG. 2 extends around the edge of the plate member to facilitate retention of loose material held between the pair of plate members.

The hand holder 14 is affixed to a central portion of the plate member and is designed to receive either the left or right hand of the user interchangeably. This provision simplifies use and also replacement should one of the scoops be broken or lost.

The hand holder is preferably in the form of a pocket 26 which receives the hand of the user although it will be understood that loops or the like which receive the hand may also be employed. The hand holder is preferably of a conventional flexible material which may be cloth, leather, plastic or the like as will be well understood in the art. The pocket 26 is of tapered construction to receive easily different sizes of hands. A large opening 28 and smaller finger opening 30 are provided for reception of the hands and fingers of the user. Side openings 32 and 34 receive the left thumb and right thumb, respectively, when either the left hand or right hand is inserted in the pocket which feature makes the scoop useable by either hand.

Figure 1:
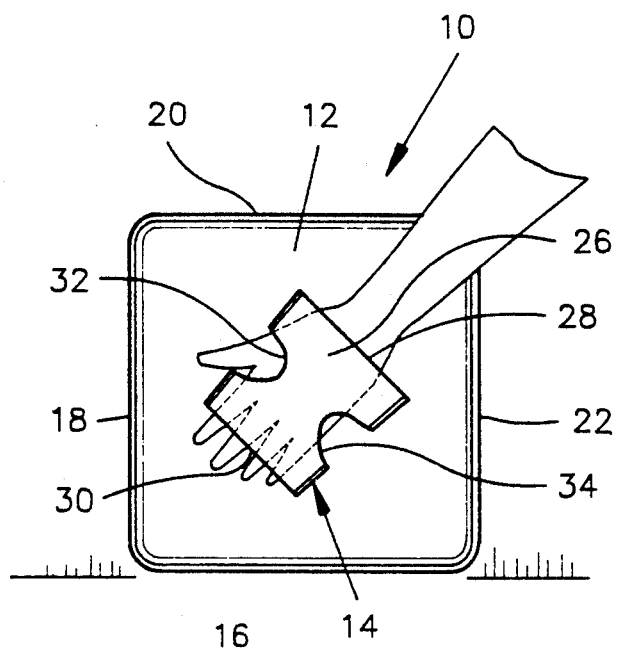
FIG. 1 is a view in side elevation of the scoop showing use for the left hand.
Figure 3:
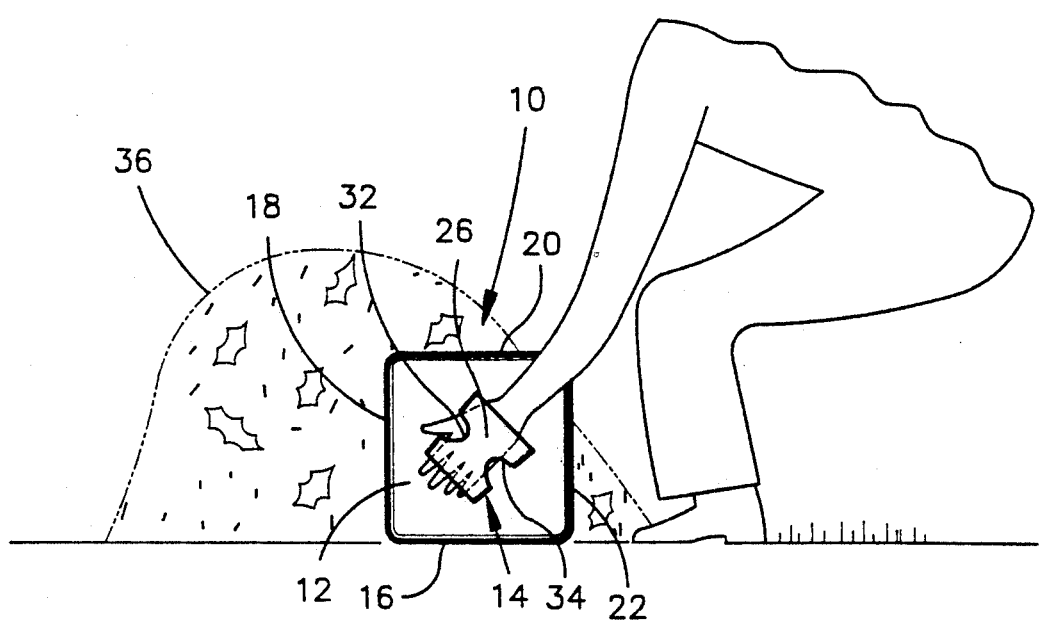
FIG. 3 is a fragmentary view on reduced scale showing the use of the scoops.

As best viewed in FIGS. 1 and 3, the hand holder is aligned diagonally on the plate member 12. This feature presents the scoop in a preferable ground-engaging or close to the ground position shown in FIGS. 1 and 3. When the left hand is employed on the scoop as shown in FIGS. 1 and 3, the bottom side 16 shown in FIG. 1 is employed in the close to the ground engaging position. When the right hand is inserted in the hand holder pocket, the adjacent side 18 becomes the bottom side and is in the close to the ground engaging position.

Although the pockets are preferably aligned in the diagonal position, it will be understood that they may be vertically disposed and aligned toward the bottom side 16. In this event, the bottom side of the scoop 16 when used by either the left hand or right hand, is employed in the ground engaging relation.

USE

The pair of scoops are simply employed in the handling or gathering together of loose material such as leaves, grass cutting and the like. As shown in FIGS.

1-3, the left and right hands of the user are simply interfitted in the hand holders 14 of separate scoops.

With the hands interfitted in the pockets of the hand holders, the user may then gather the loose material such as leaves shown in the pile 36 of FIG. 3 and by compressing the plate members toward each other, hold the leaves between the plate members for transport to another station for bagging or other disposal. The inwardly turned lips or flanges 24 improve retention of the gathered material to minimize fall out from the slightly compressed scoops.

When the hands are interfitted in the open-ended mitten-like pockets 26 of the scoops the left hand thumb fits through the opening 32 in the hand holder of one scoop and the right hand thumb fits through the opening 34 in the hand holder of the other scoop and the finger ends extend through the pocket opening 30. By means of the openings the user can arch the hand against the interior of the pocket and bring the ends of the thumb and fingers to bear against the plate member for improved maneuverability of the scoops in the gathering operation.

The diagonal orientation of the hand holder with respect to the sides 16 and 18 enables the user to interchange conveniently either the right or left hand in the same scoop, thereby eliminating the requirement of fitting a left hand scoop with the left hand and the same for the right hand. Not only is manufacture and use simplified, but wear on the close to the ground engaging sides 16 and 18 can be reduced by reversing the individual scoops from left hand to right hand use when one side, either 16 or 18, is worn more than the other.

Various changes and modifications may be made within this invention as will be apparent to those skilled in the art. Such changes and modifications are within the scope and teaching of this invention as defined in the claims appended hereto.

What is claimed is:

1. A pair of hand held scoops for scooping loose material including leaves, grass cuttings or the like from the ground, said scoops being identical in construction and each scoop comprising a plate member having at least one substantially straight side adapted to be engaged closely to the ground to scoop said loose material between said scoops when pressed toward each other, each of said scoops being provided with a hand receiving holder mounted on a central exterior portion of said plate member, at least a pair of adjacent substantially straight sides being provided, said hand holders being positioned diagonally upon an exterior of said plate members aligned toward a juncture of said pair of adjacent sides of said plate member, said sides being substantially perpendicular to one another in order that each hand holder may be used selectively by right and left hands of the user to present each of said sides selectively as a bottom ground engaging side.

2. The hand held scoops of claim 1 in which said hand receiving holder comprises a flexible pocket having an opening receiving a hand of the user.

3. The hand held scoops of claim 2 in which said pocket has a cut out opening at opposite sides of said pocket to receive a left thumb or right thumb of a user whereby said scoops may be used on each hand of the user.

4. The hand held scoops of claim 1 in which said plate member is substantially rectangular and straight sides are provided with inwardly turned edges forming a lip to facilitate retention of scooped material when the scoops are moved together with loose material therebetween.

5. A pair of hand held scoops for scooping loose material including leaves, grass cuttings or the like from the ground, said scoops being identical in construction and each scoop comprising a plate member having at least one substantially straight side adapted to be engaged closely to the ground to scoop said loose material between said scoops when pressed toward each other, each of said scoops being provided with a hand receiving holder mounted on a central exterior portion of said plate member, said plate members being provided with at least a pair of adjacent sides having inwardly turned edges forming a lip to facilitate retention of scooped material when the scoops are moved together with loose material therebetween, said hand receiving holder comprising a flexible pocket having an opening receiving a hand of the user and said pocket having a cut out opening at opposite sides of said pocket to receive selectively a left thumb and right thumb of a user whereby said scoop may be used on each hand of the user.

6. A pair of hand held scoops for scooping loose material including leaves, grass cuttings of the like from the ground said scoops being identical in construction and each scoop comprising a plate member having at least one substantially straight side adapted to be engaged closely to the ground to scoop said loose material between said scoops when pressed toward each other, each of said scoops being provided with a hand receiving holder mounted on a central exterior portion of said plate member, said plate members being provided with at least a pair of adjacent sides having inwardly turned edges forming a lip to facilitate retention of scooped material when the scoops are moved together with loose material therebetween, said pair of adjacent sides having a juncture and said hand receiving holder comprising a flexible pocket having an opening receiving a hand of the user, said pocket having a cut out opening at opposed sides of said pocket to receive a left thumb or right thumb of a user whereby said scoop may be used on each hand of the user and said hand holders being positioned diagonally upon an exterior of said plate members aligned toward said juncture of the pair of adjacent sides of said plate member to present each of said sides electively as a ground engaging side.

* * * * *